3,103,517
N-(2-THIAZOLYL)-2-(5-NITRO)FURYL-ACRYLAMIDE

Herbert C. Prosser, 320 Garces Drive, San Francisco, Calif.
No Drawing. Filed Feb. 16, 1959, Ser. No. 793,276
1 Claim. (Cl. 260—306.8)

This invention relates to certain furan and thiophene derivatives in which the heterocyclic nucleus is substituted by a nitro group, preferably in the 5 position (counting counterclockwise from the oxygen or sulfur atom in the ring) and also substituted, preferably in the 2 position, by a vinyl group. The compounds of this invention may be generally formulated as follows:

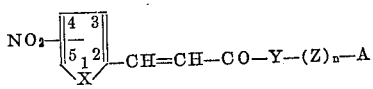

in which the nitro group is attached in the 3 or 5 position, Y is oxygen or an amide radical, Z is a methylene radical, $n$ is zero or unity, and A is an alkoxy substituted phenyl radical or a five membered heterocyclic radical.

The compounds of my invention have utility, among other things, as protozoicides. For example, they are effective against *Pentatrichomonas hominis*, *Ichthyophthirius*, *Trichomonas vaginalis*, *Trypanosoma equiperdum*, *Trypanosoma cruzi*, *Histomonas meleagridis* and *Trichomonas foetus*.

Further details concerning the protozoicidal and bactericidal properties of these compounds will be found in copending patent application Serial No. 733,847, filed by Francis P. Filice, on May 8, 1958, entitled "Compositions Having Activity as Protozoicides and Against Other Microorganisms," now abandoned.

The following specific examples will further illustrate the practice and advantage of my invention.

Example 1

N-(2-thiazolyl)-2-(5-nitro)-furylacrylamide having the formula

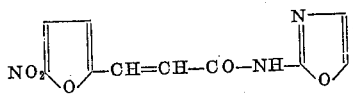

was prepared as follows:

To 1.3 grams of 2-(5-nitro)-furylacrylolyl chloride dissolved in 20 ml. warm dry ether is added a solution of 800 mg. of 2-aminothiazole in 20 ml. of dry ether. A yellow precipitate is immediately formed. The precipitate is thoroughly washed with ether and then with water to give a yellow powder which decomposes slowly at 175° C. and is N-(2-thiazoyl)-2-(5-nitro)-furylacrylamide.

Example 2

N-(4-ethoxyphenyl)-2-(5-nitro)-thienylacrylamide having the formula

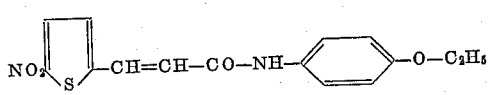

was prepared as follows:

To 40 mg. of recrystallized 2-(5-nitro)-thienylacryloyl chloride dissolved in a few cc. of dry ether is added 55 mg. of phenetidine dissolved in 2 ml. of dry ether. A brick red precipitate forms immediately which is carefully washed with ether and then water and dried. The product, N-(p-ethoxyphenyl)-2-(5-nitro) - thienylacrylamide, melts at 232° to 234° C. with decomposition.

Example 3

4-ethoxyphenyl-2-(5-nitro)-furylacrylate having the formula

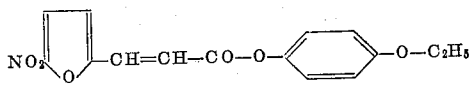

was prepared as follows:

3.5 grams of the acid chloride of 2-(5-nitro) furylacrylic acid were dissolved in 150 ml. dry benzene and 2.8 ml. pyridine were added slowly with thorough agitation of the benzene solution. A purple oil formed and was removed by filtration through sintered glass. The resulting clarified solution was reacted with 4.7 grams of p-ethoxyphenol dissolved in about 150 ml. dry benzene. The two solutions were mixed rapidly. Very little precipitation occurred during mixing. On standing at room temperature two days and then cooling in a refrigerator, a small quantity of buff colored needles precipitated. The benzene mother liquor was extracted with a large volume of water, then twice with 10% NaOH solution, then twice with 2 N HCl solution, then with saturated NaHCO$_3$ solution and then with saturated NaCl solution. The benzene solution was then dried with anhydrous Na$_2$SO$_4$ and fractionally evaporated under vacuum to yield beautiful yellow needles having a melting point of 111°–112.5° C. They had the same melting point after recrystallization from hot benzene.

Example 4

N-furfuryl-2-(5-nitro)-furylacrylamide having the following formula

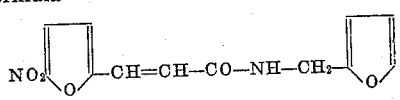

was prepared as follows:

To 70 mgs. of 2-(5-nitro) furylacryloyl chloride dissolved in 25 ml. of dry ether were added 39 mgs. of furylamine. A light yellow precipitate formed immediately which was washed with ether and water, then filtered and dried. This compound decomposed at 108–113° C.

In accordance with the invention the two rings (i.e., the furan ring and the ring represented by (A) in the compounds may be further substituted, for example, by methyl or ethyl groups or by a halogen radical. Also, the hydrogen on the amide nitrogen in compounds such as those in Examples 1, 2 and 4 may be substituted, for example, by another acyl (R·CO—) group or by another ring substituent or by an alkyl group.

It is, therefore, apparent that certain novel compounds having advantageous properties and methods of preparing the same have been provided.

I claim:
N-(2-thiazolyl)-2-(5-nitro) furylacrylamide.

References Cited in the file of this patent

Takahashi et al.: Chem. Abstracts, volume 44, column 5373 (1950).
Uota et al.: Chem. Abstracts, volume 50, column 13997 (1956).